May 7, 1929.  L. M. WOOLSON  1,712,466
INTERNAL COMBUSTION ENGINE
Filed April 7, 1924  2 Sheets-Sheet 1

Inventor
Lionel M. Woolson
By  
Attorney

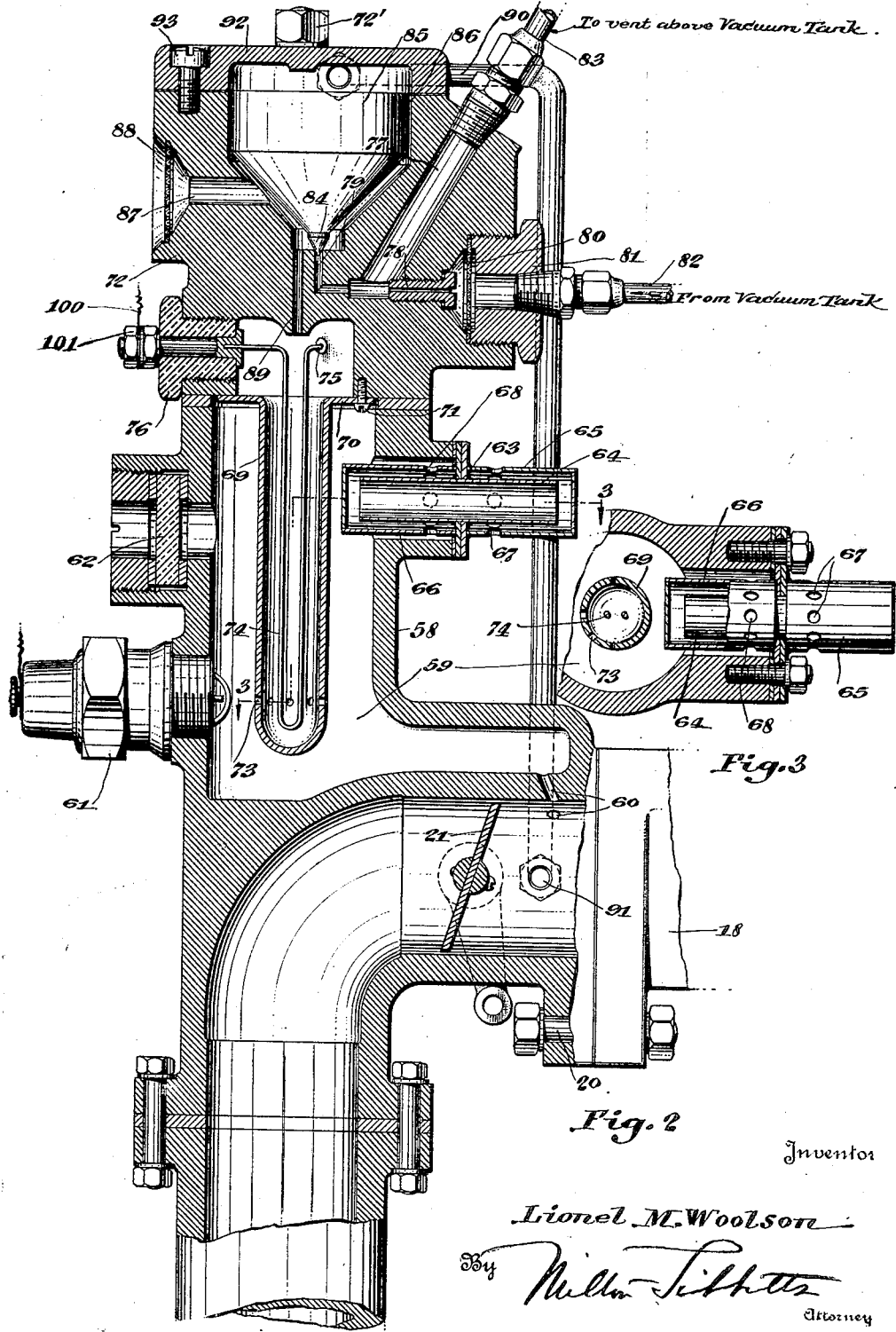

Patented May 7, 1929.

1,712,466

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION ENGINE.

Application filed April 7, 1924. Serial No. 704,555.

This invention relates to internal combustion engines, and particularly to the means for forming and heating the mixture supplied to the cylinders of the engine.

One of the objects of the present invention is to provide such efficient mixture forming and heating means that the engine may be started and run when cold with practically the same carburetor mixture as is used when the engine is hot.

Another object is to provide fuel vapor forming means for a combustion heater for obtaining quicker starting of the heater.

Another object is to provide vapor forming means for a combustion heater so connected to the engine that some of the vapor will reach the engine cylinders and be fired therein.

Another object is to provide a large amount of heat for the mixture when the engine is running idle or on low throttle and to supply a lesser amount of heat on open throttle.

Another object is to provide an initial supply of liquid fuel for a combustion heater in greater quantity than is normally supplied when the heater is in operation.

Another object is to provide a fuel well for a combustion heater which may be filled from a vacuum tank without further mechanism than is contained in the vacuum tank itself.

Another object is to provide a combustion heater with muffling means for the air inlet.

Other objects will appear from the following description taken in connection with the drawings, which form a part of this specification, and in which:

Fig. 2 is an enlarged sectional view through the combustion heater part of the invention shown in Fig. 1, and Fig. 3 is a transverse section substantially on the line 3—3 of Fig. 2.

Figure 1:
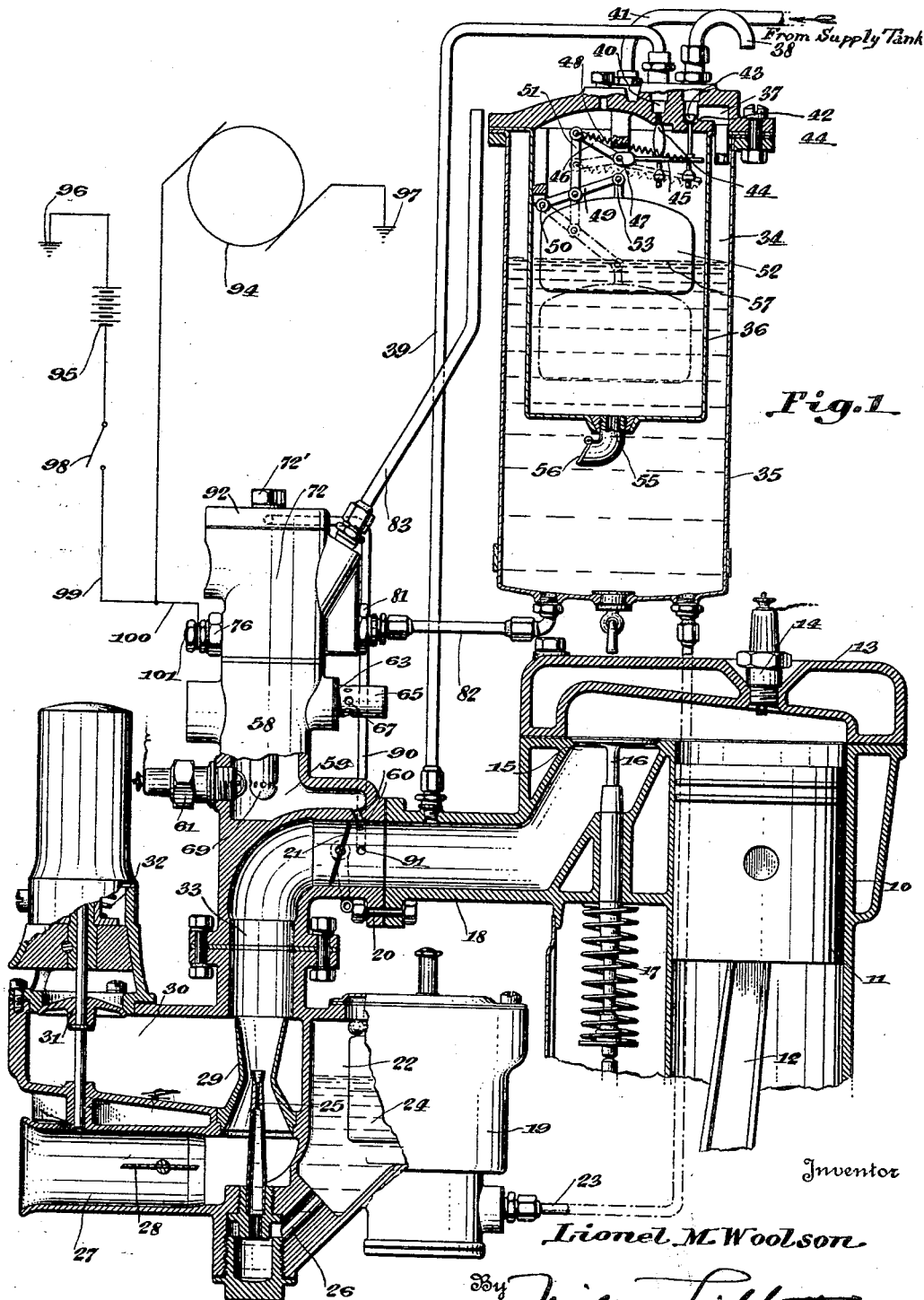
Fig. 1 is a comprehensive view, largely in section and partly in diagram, illustrating an internal combustion engine and the various parts that go to make up the present invention.

Referring to the drawings, 10 represents the cylinder block of an internal combustion engine which may be a single cylinder engine or a multi-cylinder engine. Other conventional parts of the engine are the piston 11, the connecting rod 12, the detachable head 13, the spark plug 14 for igniting the charge, an intake port 15, the intake valve 16 for controlling the port, the spring 17 which closes the valve 16, and the intake conduit or manifold 18 which supplies the engine cylinder with mixture from the carburetor. The carburetor is illustrated generally at 19 and it is connected to the intake conduit 18 by one or more bolts 20. The throttle valve 21 controls the passage of mixture from the carburetor to the intake conduit.

The carburetor is of conventional form and comprises a float chamber 22 which is supplied from a pipe 23 and the level within which is controlled by a float 24 and suitable valve mechanism not shown. The fuel nozzle of the carburetor is indicated at 25 and it communicates with the float chamber 22 through a passage 26. The carburetor main air inlet is shown at 27, controlled by a choke valve 28, and delivering air through a Venturi tube 29 which surrounds the fuel nozzle 25. An auxiliary air inlet is shown at 30 controlled by a valve 31, closed by a spring 32. The operation of the carburetor to supply mixture to the mixing chamber 33 is thought to be well known. The mixture is drawn past the throttle 21 and through the intake conduit 18 to the engine cylinders by the suction caused when the pistons move downwardly therein.

A vacuum tank of the well known Stewart type is indicated generally at 34. It comprises an outer tank 35 and an inner tank 36. The outer tank is always vented through a passage 37 and pipe 38 and the lower part of this tank is connected to the carburetor 19 by means of the pipe 23 hereinabove referred to. Thus there is always gravity flow of gasoline or other liquid fuel from the tank 35 to the float chamber 22 of the carburetor 19, and the float in said chamber maintains the level therein slightly below the top of the fuel nozzle 25.

The upper part of the inner tank 36 has a connection with the intake conduit 18 of the engine through a pipe 39 and a port 40 and a supply pipe 41 connects the upper part of said tank 36 with the main supply tank, not shown in the drawing. Further, the upper part of said inner tank 36 is vented through a port 42 which connects with the passage 37 and pipe 38. This port 42 is controlled by a valve 43 and the port 40 is controlled by a valve 44. Said valves 43 and 44 are intermittently operated by a float mechanism within the tank 36. Two oppositely extending levers 45 and 46 are pivoted at 47 inside of the tank 36 and a spring 48 connects the outer ends of these levers as shown in the drawing. A third lever 49 is pivoted at 50 and a connecting link 51 connects the levers 46 and 49. A float 52 for operating the valves is arranged in the tank 36 and is pivotally connected to the lever 49 as at 53. At the bottom of the tank 36 is an outlet 55 covered by a flap valve 56 which operates by gravity to control the outlet or port 55, this valve permitting liquid to flow outwardly through the port but being adapted to seat and close the port 55 when there is suction within the tank 36. In Fig. 1, the vacuum tank is shown with the float in its uppermost position and the level of the liquid in the tanks 35 and 36 is substantially on the line 57. In this position of the float the spring 48 is pulling upwardly on the lever 45 and this lever consequently holds the valve 44 closed and the valve 43 open so that the tank 36 is disconnected from the intake manifold suction and is vented through the port 42. This will cause the liquid in the tank 36 to flow into the tank 35 as soon as some of the liquid is drawn from the latter tank. As the liquid flows out of the tank 36 the float 52 will of course drop and pull the lever 49 down with it. This will also pull the lever 46 downwardly so that the spring 48 will snap across the pivot 47 and draw the lever 45 downwardly. This downward movement of the lever 45 will cause the valve 43 to close the vent port 42 and at the same time it will withdraw the valve 44 from the port 40. In this position of the valves the vent for the tank 36 is closed and the suction connection to the intake manifold or conduit is opened. This of course creates suction or a reduction of pressure in the tank 36 which is sufficient to draw a supply of liquid fuel through the pipe 41 from the main supply tank and the operation of the devices is then repeated.

The combustion heater or fuelizer of the engine is indicated generally at 58. It is shown largely in elevation in Fig. 1 and in section in Figs. 2 and 3. It comprises a combustion chamber 59 having one or several outlets ports 60 to the intake conduit 18 beyond the throttle valve 21. Thus the full suction of the intake conduit is communicated to the combustion chamber 59 of the heater. A spark plug 61 is arranged preferably in the lower part of the chamber 59 and a suitable glass window 62 may be provided as shown particularly in Fig. 2. This window is for observing how the heater is firing.

A muffled air inlet for the combustion chamber is indicated at 63 and this air inlet comprises an inner tube 64 and two outer tubes 65 and 66 which are closed at both ends. The outer tube 65 has a series of openings 67 adjacent its inner end and the tube 66 has a series of openings 68. This permits the passage of air by a circuitous route through the openings 67, though the passage between the outer part of the tube 64 and the tube 65, through the tube 64, through the passage between the inner part of the tube 64 and the tube 66, and then through the ports or openings 68 into the combustion chamber. This arrangement of air passages suitably muffles the roar that would otherwise be heard from the operation of the combustion heater.

A fuel receptacle in the form of a tube or elongated cup 69 is mounted in the combustion chamber, being shown as having a flange 70 which is secured as by screws 71 to a casting or head block 72 forming the upper part of the combustion chamber. This head block 72 is detachably connected to the body of the heater as by one or two bolts 72' which extend through the head block 72 and are threaded into the body of the heater. Adjacent the lower end of the tube or cup 69 is a lateral opening 73. In fact, there are several of these openings 73 slightly above the closed bottom of the tube. Arranged within the tube is an electric heating element or resistance wire 74 which is grounded at 75 on the head block 72 and the other end of which is insulated by and extends through a plug 76 threaded into the head block 72. This heating coil is suitably connected with a battery and switch as will be hereinafter described.

Mounted in the head block 72 is the means for feeding liquid fuel to the receptacle 69 or to the combustion heater and this means comprises a well 77 formed in the head block and having an inlet passage 78 and an outlet passage 79, the inlet passage being smaller than the outlet passage and being of a size to accurately meter the liquid fuel passing through it. This inlet passage is connected through a chamois or other strainer 80, a plug 81, and a pipe 82, with the lower part of the tank 35 of the vacuum tank hereinbefore described so that liquid fuel is fed by gravity from the vacuum tank to the well 77. The well 77 is vented by a pipe 83 which runs to a point above the highest level of liquid in the vacuum tank or approximately to the top of the vacuum tank, as shown in Fig. 1. This permits the well 77 to fill up to the same level as that in the vacuum tank when the outlet 79 is closed and the engine is stopped.

The outlet 79 from the well 77 is controlled by a valve 84 which has a piston part 85 mounted in a cylindrical recess 86 into which the passage 79 opens. The recess 86 is provided with an air vent 87 below the piston part of the valve 84 and this vent is shown as closed by a chamois or other air strainer 88 so that dirt will not enter the recess.

The liquid fuel that enters the recess 86 through the port 79 may pass directly through a downwardly extending passage 89 into the tube or cup 69 and through the openings 73 into the combustion chamber of the heater or fuelizer.

The recess 86 is closed by a cap 92 which is detachably secured to the head block 72 as by the screws 93. The upper part of the recess 86, above the piston portion 85 of the valve, is connected by a pipe 90 with the intake conduit of the engine beyond the throttle valve as shown at 91, in both Figs. 1 and 2. Thus when the engine is running or is operated by the electric starting motor the suction in the intake conduit is communicated to the upper part of the recess 86 above the piston 85 and the valve 84 is thereby lifted from its seat and the passage 79 from the well 77 is opened, thus permitting the gasoline or other liquid fuel to flow from the well 77 through the passages 79 and 89 into the cup 69. The well forms an initial supply reservoir for producing a rich mixture for the combustion heater when starting the engine.

Referring particularly to Fig. 1, an electric starting motor for the internal combustion engine is indicated diagrammatically at 94 and a battery is shown at 95. 96 and 97 are grounds and 98 is a switch in the line 99 which extends to the starting motor. A conductor 100 is connected between the line 99 and the terminal 101 of the electric heating element 74, and the latter element is grounded on the engine at 75 as hereinabove described. Thus the electric heating element is in parallel with the starting motor so that when the starting switch 98 is closed to turn the engine over the electric heating element 74 is energized. As soon as the engine starts the switch 98 is opened and the starting motor 94 automatically disconnects and the heating element 74 becomes inactive.

In operation, with the engine cold, the starting switch 98 will be closed and the starting motor 94 will turn the engine over slowly thus creating a partial vacuum in the intake conduit 18. The vacuum tank 35 is either full or a few revolutions of the engine will pull some gasoline into the vacuum tank from the main supply tank, and some of this gasoline will flow through the pipe 23 into the carburetor 19. With this gasoline the carburetor 19 will produce a mixture which will be drawn into the intake manifold 18 past the slightly open throttle valve 21, but this will be a cold mixture and will be difficult to ignite in the engine. The richness of this mixture may be regulated by adjusting the tension of the spring 32 of the carburetor.

The well 77 of the combustion heater will be filled with gasoline up to the same level as that in the vacuum tank 35 and the valve 84 will be closed until the engine is turned over. The suction thus created in the intake manifold 18 will be communicated to the piston 85 through the pipe 90 and the valve 84 will be lifted from its seat. This permits some of the gasoline in the well 77 to run down over the electric heating element 74 and into the cup 69. The closing of the starting switch 98 has also energized the heating element 74 and the gasoline in the cup 69 is thereby immediately vaporized, this vapor passing through the openings 73, some of which are very close to the spark plug 61, into the combustion chamber of the combustion heater where it mixes with the air which enters through the muffled air intake 63. A partial vacuum is created in the combustion chamber 59 due to the fact that through the openings 60 the chamber is in communication with the intake manifold 18 beyond the throttle valve 21, and some of this gasoline vapor is immediately drawn into the engine cylinder. The turning over of the engine has operated its ignition mechanism and the spark plug 61, therefore, which is connected to the engine ignition mechanism, produces a spark within the combustion chamber 59 and the vaporized gasoline and air therein forms such a mixture that will be ignited by said spark. A torch-like effect is produced by reason of the suction through the openings 60, gasoline continuing to enter from the well 77, with some air through the vent 87, and with additional air through the air inlet 63. The heating element 74 continues to vaporize this gasoline and a rich burning mixture is produced as long as the starting switch 98 remains closed. This combustion in the chamber 59 heats the wall between the chamber and the adjacent mixture passage thus heating some of the mixture from the carburetor 19. The burnt products of combustion passing through the openings 60 into the intake conduit 18 further heat the incoming mixture and dilute it to such an extent that it is highly explosive. This highly explosive mixture soon reaches the engine and is there fired, starting the engine on its cycle of operation. The gasoline vapor which sometimes comes directly from the cup 69 without being fired also assists in the initial operation of the engine. As the engine starts the switch 98 is opened by the operator and the starting motor automatically disconnects from the engine. This action also breaks the current flowing through the heating element 74 but by this time the combustion heater has itself begun to heat the tube or cup 69 and its contents and thereafter the liquid fuel that enters from the passage 89 is heated by the combustion heater itself. Also, the supply of gasoline in the well 77 has by this time about become exhausted and a lesser quantity of gasoline is thereafter fed to the combustion heater by reason of the restricted inlet passage 78. This liquid feed is substantially constant because it is under gravity pressure only due to the vent 87 in the recess 86 and the vent 83 in the well 77.

As long as the engine continues to run the spark 61 is of course operating and the combustion heater continues to perform its heating function. As the throttle valve 21 is opened the suction through the combustion heater becomes less and it consequently operates with less intensity.

When the engine is stopped, as by cutting off its ignition, the suction in the intake conduit ceases and the valve 84 drops to its seat and closes the passage 79. The combustion heater thereby ceases to function and the well 77 proceeds to slowly fill up to the level of the vacuum tank 35 so that it will be ready to supply an initially rich mixture for the next start.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In an internal combustion engine, the combination with the intake conduit thereof, of a combustion heater having its outlet connected to said conduit, and liquid fuel feeding means for said heater also connected to said conduit.

2. In an internal combustion engine, the combination with the intake conduit thereof, of a combustion heater having its outlet connected to said conduit, a fuel feeding means and means for actuating the fuel feeding means connected to the intake conduit between the combustion heater and the engine.

3. In an internal combustion engine, the combination with the intake conduit thereof, of a carburetor for supplying mixture to said conduit, a vacuum tank for supplying liquid fuel to said carburetor, a combustion heater connected to said conduit, and means, independent of the carburetor, for supplying said combustion heater from said vacuum tank.

4. In an internal combustion engine, the combination with the intake conduit thereof, of a combustion heater connected to said conduit, means for feeding liquid fuel to said heater, and means controlling said feeding means comprising a suction line to the intake conduit intermediate said heater and engine.

5. In an internal combustion engine, the combination with the intake conduit thereof, of a combustion heater connected to said conduit comprising an electric heating unit for initially heating the liquid fuel for the combustion heater, and means for heating the liquid fuel for the combustion heater by the operation of the heater itself after the heater has started to function, said latter heating means operating on the liquid fuel at substantially the same point in the heater as the former heating means.

6. In an internal combustion engine, the combination with the intake conduit and the throttle valve therein, of a combustion heater having its outlet connected to said conduit beyond the throttle valve, and means connected with the intake conduit for controlling the feed of liquid fuel to the heater.

7. In an internal combustion engine, the combination with the intake conduit and the throttle valve therein, of a combustion heater connected to said conduit beyond the throttle valve, fuel feeding means for the combustion heater, and a suction control connection for said means independent of the connection of the heater to the intake conduit.

8. A combustion heater comprising a liquid fuel well having an outlet to the heater chamber and having an inlet smaller than the outlet, a valve for said outlet, and suction means for controlling said valve.

9. A combustion heater comprising a liquid fuel well having an outlet to the heater chamber and having an inlet smaller than the outlet, a valve for said outlet, and suction means independent of the pressure in the heater chamber for controlling said valve.

10. A combustion heater comprising a combustion chamber, a vented fuel well above said chamber having an outlet into said chamber and having an inlet smaller than the outlet, and valve means for said outlet.

11. A combustion heater comprising a chamber, a vented fuel well in the top of the chamber having an outlet to said chamber and having an inlet for the liquid fuel, and a valve for said outlet.

12. In an internal combustion engine, the combination of a suction operated combustion heater, a feed valve for said heater, a suction control means for said feed valve, and a suction operated liquid fuel supply device connected to said feeding means.

13. In an internal combustion engine, the combination with the intake conduit thereof, of a combustion heater, a feed valve for said heater, a liquid fuel supply device for said heater, and suction connections from said conduit to the combustion heater, the feed valve, and the supply device.

14. A combustion heater comprising a combustion chamber, means for feeding liquid fuel to said chamber, means for admitting filtered air with said fuel, means for vaporizing said fuel within the chamber before ignition, means for muffling air into the chamber, means for igniting the vaporized fuel and air within the chamber, and means associated with said vaporizing means for pre-vaporizing the liquid fuel by the operation of the heater itself after ignition has started.

15. In an internal combustion engine, the combination of a vacuum tank, a combustion heater having a fuel well connected to said vacuum tank, and said well having a vent above the highest liquid level in said vacuum tank.

16. In an internal combustion engine, the combination of a vacuum tank, a combustion heater having a liquid fuel supply well, a pipe connection from said tank to said well to supply fuel to the latter, said well having a vent above the highest liquid level in said vacuum tank, and a valve controlling the outlet of liquid from said well to the chamber of said heater.

17. A combustion heater having a combustion chamber, a spark plug for igniting the mixture therein, a fuel cup extending into the chamber and having outlet openings adjacent its lower end, and means for feeding fuel into said cup.

18. A combustion heater having a combustion chamber, a spark plug for igniting the mixture therein, a fuel cup extending into the chamber and having an outlet adjacent its lower end, an electric heating element in said cup, and means for feeding liquid fuel into said cup.

19. A combustion heater comprising a combustion chamber, a spark plug therein, a fuel cup arranged in said chamber and having a side outlet opening adjacent said spark plug, and means for feeding liquid fuel to said cup.

20. A combustion heater comprising a combustion chamber, a spark plug therein, a fuel cup arranged in said chamber and having a side outlet opening adjacent said spark plug, an electric heating element arranged in said cup, and means for feeding liquid fuel to said cup.

21. A combustion heater comprising a combustion chamber, an elongated fuel cup arranged vertically therein, said cup having an outlet opening into the chamber adjacent the lower end of the cup, an elongated heating element extending downwardly into said cup, and liquid fuel feeding means for said cup.

22. A combustion heater comprising a combustion chamber, a spark plug therein, a fuel receptacle extending into the chamber and having an outlet opening to the chamber adjacent one end of the receptacle, an electric heating element extending into said receptacle, and a liquid fuel well arranged above said receptacle and having a valved passage arranged to discharge into said receptacle.

23. A combustion heater comprising a combustion chamber, a spark plug therein, a fuel receptacle extending into the chamber and having an outlet opening to the chamber adjacent one end of the receptacle, an electric heating element extending into said receptacle, a liquid fuel well arranged above said receptacle and having a valved passage arranged to discharge into said receptacle, and means for operating the valve of said passage by suction.

24. In an internal combustion engine, the combination of an intake conduit, of a combustion heater having a chamber connected to said conduit beyond the throttle valve, a fuel receptacle in said chamber, a fuel well arranged above said receptacle and having an outlet passage arranged to discharge into said receptacle, a valve for said outlet passage, and a pipe connection above said valve to the intake conduit beyond the engine throttle valve whereby the valve for said fuel passage is opened by suction from the engine.

25. In an internal combustion engine, the combination of a combustion heater having a combustion chamber, and a fuel feeding means therefor comprising a chamber, said chamber having an inlet opening and an outlet passage extending to the combustion heater chamber, and said chamber having a vent, a reciprocating valve arranged in said chamber above said vent and adapted to control said inlet opening.

26. A combustion heater comprising a combustion chamber, means for feeding liquid fuel to said chamber, means for admitting filtered air with said fuel, means for vaporizing said liquid fuel before ignition, means for muffling air into the chamber, means for igniting the vaporized fuel and air within the chamber and means for observing action within the chamber.

In testimony whereof I affix my signature.

LIONEL M. WOOLSON.